(12) United States Patent
Rosenboom et al.

(10) Patent No.: US 6,464,607 B1
(45) Date of Patent: Oct. 15, 2002

(54) POWER TRANSMISSION BELT

(75) Inventors: Jay Ahren Rosenboom, Lincoln, NE (US); Paul Norman Brinkman, Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/461,827

(22) Filed: Dec. 15, 1999

(51) Int. Cl.$^7$ .............................................. F16G 5/20
(52) U.S. Cl. ...................................................... 474/263
(58) Field of Search ................................ 474/260, 261, 474/237, 263, 264

(56) References Cited

U.S. PATENT DOCUMENTS

| | | | |
|---|---|---|---|
| 2,699,685 A | * 1/1955 | Waugh | 74/233 |
| 4,481,335 A | 11/1984 | Stark, Jr. | 525/261 |
| 4,956,036 A | 9/1990 | Sedlacek | 156/137 |
| 5,091,471 A | 2/1992 | Graves | 525/90 |
| 5,382,198 A | 1/1995 | Janne | 474/205 |
| 5,415,594 A | * 5/1995 | Kitahama et al. | 474/263 |
| 5,521,248 A | 5/1996 | Drake et al. | 525/75 |
| 5,610,217 A | 3/1997 | Yarnell et al. | 524/397 |
| 5,698,650 A | 12/1997 | Jourdain et al. | 526/283 |
| 5,776,294 A | 7/1998 | Nagel | 156/307.7 |
| 6,251,977 B1 | * 6/2001 | Georget et al. | 524/397 |

FOREIGN PATENT DOCUMENTS

| | | | |
|---|---|---|---|
| EP | 0571887 | 12/1993 | F16G/1/28 |
| EP | 0964030 | 12/1999 | C08L/23/16 |

OTHER PUBLICATIONS

The "Ricobond & Ricon MA Bulletin" from Ricon Resins, Inc.

Copy of a paper entitled "Compounding with Selected Additives to Promote Adhesion Between Dissimilar Elastomer", presented at the 152$^{nd}$ Meeting of the Rubber Division, American Chemical Society in Cleveland, Ohio, on Oct. 21–24, 1997.

* cited by examiner

Primary Examiner—David A. Bucci
Assistant Examiner—Vicky A. Johnson
(74) Attorney, Agent, or Firm—Bruce J. Hendricks; John D. DeLong

(57) ABSTRACT

An endless power transmission belt having
  (1) a tension section;
  (2) a cushion section; and
  (3) a load-carrying section disposed between said tension section and cushion section; and the belt containing an elastomeric composition comprising
    (a) 100 parts of a rubber derived from
      (i) 50 to 100 parts by weight of an ethylene alpha olefin elastomer; and
      (ii) 0 to 50 parts by weight of a rubber selected from the group consisting of silicone rubber, polychloroprene, epichlorohydrin, acrylonitrile rubber, hydrogenated acrylonitrile rubber, zinc salts of unsaturated carboxylic acid ester grafted hydrogenated nitrile butadiene-elastomer, natural rubber, styrene-butadiene rubber, 1,4-trans-polybutadiene, ethylene-vinyl-acetate copolymer, ethylene methacrylate copolymers and terpolymers, chlorinated polyethylene, chlorosulfonated polyethylene, alkylated chloro sulfonated polyethylene, trans-polyoctenamer, polyacrylic rubber, and mixtures thereof;
    (b) from 1 to 30 parts by weight per 100 parts by weight of total rubber (phr) of a polybutadiene adduct of maleic acid anhydride.

19 Claims, 2 Drawing Sheets

POWER TRANSMISSION BELT

BACKGROUND OF THE INVENTION

Recent developments in the automotive industry have resulted in higher engine output in a more compact engine compartment. As a result, power transmission belts on these engines have been required to operate under higher load, at high tensions and at high temperatures. This environment demands a high quality belt capable of withstanding these severe conditions along with consumer demand for longer lasting belts. Therefore, there exists a need for new and improved belts to quench the demand in the industry.

SUMMARY OF THE INVENTION

The present invention relates to a power transmission belt that is characterized by a rubber composition containing a mixture of an ethylene-alpha olefin elastomer and a polybutadiene adduct of maleic anhydride.

BRIEF DESCRIPTION OF THE FIGURES

The accompanying figure shows embodiments of this invention in which.

DETAILED DESCRIPTION OF THE INVENTION

There is disclosed an endless power transmission belt having (1) a tension section;
(2) a cushion section; and
(3) a load-carrying section disposed between said tension section and cushion section; and the belt containing an elastomeric composition comprising
  (a) 100 parts of a rubber derived from
    (i) 50 to 100 parts by weight of an ethylene alpha olefin elastomer; and
    (ii) 0 to 50 parts by weight of a rubber selected from the group consisting of silicone rubber, polychloroprene, epichlorohydrin, acrylonitrile rubber, hydrogenated acrylonitrile rubber, zinc salts of unsaturated carboxylic acid ester grafted hydrogenated nitrile butadiene-elastomer, natural rubber, styrene-butadiene rubber, 1,4-trans-polybutadiene, ethylene-vinyl-acetate copolymer, ethylene methacrylate copolymers and terpolymers, chlorinated polyethylene, chlorosulfonated polyethylene, alkylated chlorosulfonated polyethylene, trans-polyoctenamer, polyacrylic rubber, and mixtures thereof;
  (b) from 1 to 30 parts by weight per 100 parts by weight of total rubber (phr) of a polybutadiene adduct of maleic acid anhydride.

The present invention relates to a new and improved power transmission belt. The power transmission belt of the present invention may be embodied in accordance with the three conventional-type of designs of power transmission belt. In the first design, the cushion section is fabric-faced, ground short fiber-reinforced cushion section or molded gum with short fiber flocked faced cushion section. In the second design, the cushion section has a cut edge or fabric jacketless belt which has plies of rubber-coated fabric or plies of fiber reinforced stock as the base material. The third design is a textile jacketed belt which is wrapped with one or more jackets of textile fabric.

Figure 1:
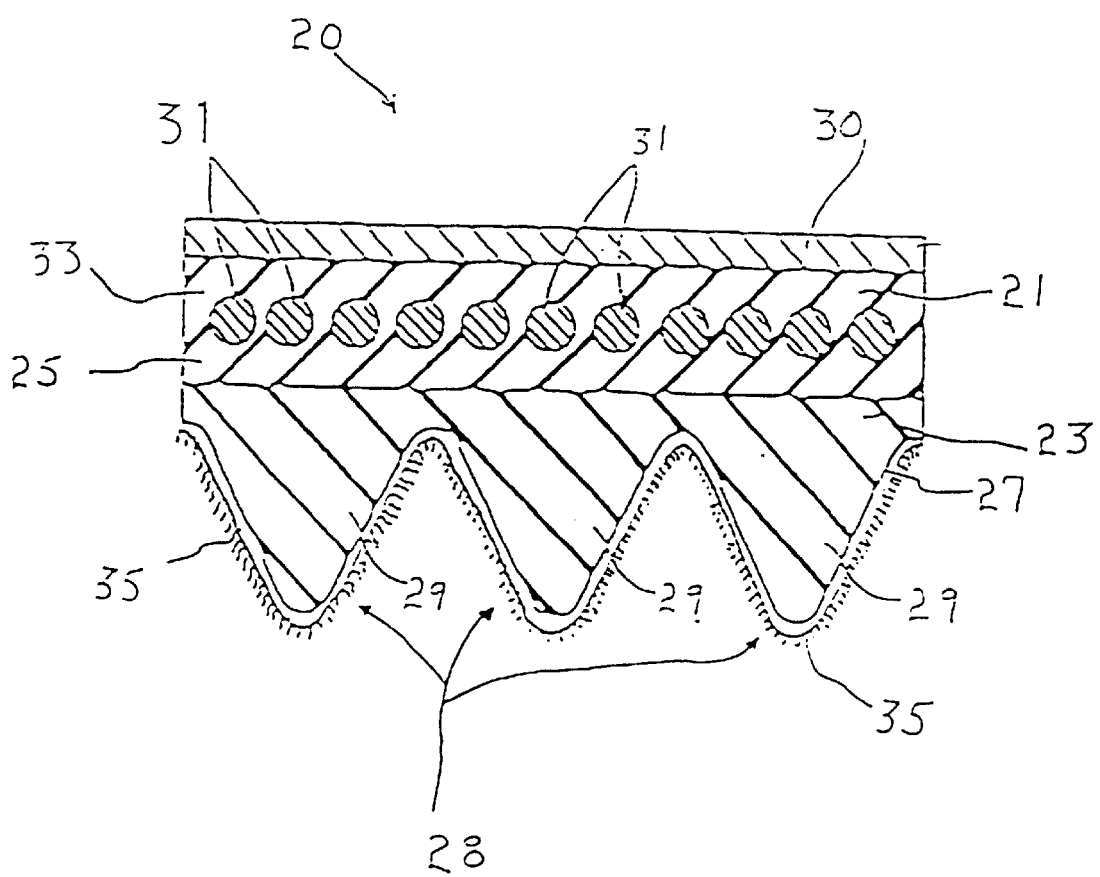
FIG. 1 is a fragmentary perspective view illustrating one embodiment of an endless power transmission belt of this invention.

Reference is now made to FIG. 1 of the drawing which illustrates an endless power transmission belt structure or belt of this invention which is designated generally by the reference numeral 20. The belt 20 is particularly adapted to be used in associated sheaves in accordance with techniques known in the art. The belt is particularly suited for use in short center drives, exercise equipment, automotive drives, farm equipment, so-called torque sensing drives, application where shock loads of varying belt tension are imposed on the belt, applications where the belt is operated at variable speeds, applications where the belt is spring-loaded to control its tension, and the like.

The belt 20 comprises a tension section 21, a cushion section 23 and a load-carrying section 25 disposed between the tension section 21 and cushion section 23. The belt 20 may optionally have an inside ply or inner fabric layer 27, adhered to a drive surface 28 and three ribs 29 or Vs which are fabric-coated. The belt 20 of FIG. 1 has a fabric backing 30. The fabric backing 30 may be bidirectional, non-woven, woven or knitted fabric. The fabric backing layer 30 may be frictioned, dipped, spread, coated or laminated.

In accordance with the belt of FIG. 1, the fabric facing layer 27 may be made from a bi-directional, non-woven, woven or knitted fabric. The preferred fabric layer 27 is non-woven.

The fabrics to be used on the facing layer 27 may be made of conventional materials including nylon (such as nylon 4,6, nylon 6,6 and nylon 6), polyester/rayon, cotton, cotton/rayon, polyester, cotton/polyester, nylon/polyester, cotton/nylon, Lycra™ (segmented polyurethane), aramid, rayon, and the like. Preferably, the fabric is made of polyester/rayon.

The load-carrying section 25 has load-carrying means in the form of load-carrying cords 31 or filaments which are suitably embedded in an elastomeric cushion or matrix 33 in accordance with techniques which are well known in the art. The cords 31 or filaments may be made of any suitable material known and used in the art. Representative examples of such materials include aramids, fiberglass, nylon, polyester, cotton, steel, carbon fiber and polybenzoxazole.

The drive surface 28 of the belt 20 of FIG. 1 is multi-V-grooved. In accordance with other embodiments, it is contemplated herein the belts of the present invention also include those belts where the drive surface of the belt may be flat, single V-grooved and synchronous. Representative examples of synchronous include belts having trapezoidal or curvilinear teeth. The tooth design may have a helical offset tooth design such as shown in U.S. Pat. Nos. 5,209,705 and 5,421,789.

The belt 20 of FIG. 1 has one drive surface 28. However, it is contemplated herein that the belt may have two drive surfaces (not shown) such as in a double-sided belt. In such an instance, one or both drive surfaces may be with fabric as described herein. Preferably, the belt 20 has one drive surface.

The elastomeric compositions for use in the tension section 21 and cushion section 22 may be the same or different.

The elastomeric composition for use in the tension section 21 and/or cushion section 22 contains 100 parts of an elastomer of which 50 to 100 parts by weight is an ethylene alpha olefin elastomer. Preferably, from 60 to 100 parts by weight is an ethylene alpha-olefin elastomer. The ethylene-alpha-olefin elastomer includes copolymers posed of ethylene and propylene units (EPM), ethylene and butene units, ethylene and pentene units or ethylene and octene units (EOM) and terpolymers composed of ethylene and propylene units and an unsaturated component (EPDM), as well as mixtures thereof As the unsaturated component of EPDM, any appropriate non-conjugated diene may be used, including, for example, 1,4-hexadiene, dicyclopentadiene or ethylidenenorbornene (ENB). The ethylene-alpha-olefin elastomer preferred in the present invention contains from about 35 percent by weight to about 80 percent by weight of the ethylene unit, from about 65 percent by weight to about 25 percent by weight of the propylene or octene unit and 0 to 10 percent by weight of the unsaturated component. In a more preferred embodiment, the ethylene-alpha-olefin elastomer contains from about 50 percent to about 70 percent by weight of the ethylene unit and, in a most preferred embodiment, the ethylene-alpha-olefin elastomer contains from about 55 percent to about 65 percent of the ethylene unit. The most preferred ethylene-alpha-olefin elastomer is EPDM.

The remaining rubber, from 0 to 50 parts by weight, of the elastomer composition is selected from the group consisting of silicone rubber, polychloroprene, epichlorohydrin, acrylonitrile rubber, hydrogenated acrylonitrile rubber, zinc salts of unsaturated carboxylic acid ester grafted hydrogenated nitrile butadiene elastomer, natural rubber, synthetic polyisoprene, styrene-butadiene rubber, 1,4-trans-polybutadiene, ethylene-vinyl-acetate copolymer, ethylene methacrylate copolymers and terpolymers, chlorinated polyethylene, chlorosulfonated polyethylene, alkylated chlorosulfonated polyethylene, trans-polyoctenamer, polyacrylic rubber, and mixtures thereof Preferably, from 0 to 40 parts by weight of the total 100 parts by weight of elastomer is one or more rubber listed above. Preferably, the rubber is ethylene vinyl acetate.

The elastomeric composition contains from 1 to 30 phr of a polybutadiene adduct of maleic acid anhydrate. Preferably, from 5 to 15 phr is present. The polybutadiene may be a random polybutadiene polymer containing both 1,4 and 1,2 butadiene units. The amount of 1,2 vinyl bands may range from 15 to about 90 percent by weight 1,2 vinyl bands. Preferably, from 20 to 70 percent by weight of 1,2 vinyl bands are present. Preferred adducts are the maleic adduct resins sold by Ricon Resins Inc of Grand Junction, Colo., under the trademark Ricobond™. Specific examples include Ricobond 1731 (mol weight Mn of approximately 6400 and a viscosity of approximately 500 poise at 45° C.), Ricobond 203 (mol weight Mn of approximately 7500 and a viscosity of approximately 100 poise at 45° C.) and Ricobond 1756 (mol weight Mn of approximately 3000 and a viscosity of approximately 1400 poise at 55° C.).

In accordance with a preferred embodiment, the rubber composition containing a mixture of ethylene-alpha olefin elastomer and a polybutadiene adduct of maleic anhydride is used in the cushion section of the belt.

Conventional carbon blacks may also be present in the composition. Such carbon blacks are used in conventional amounts ranging from 5 to 250 phr. Preferably, the carbon blacks are used in an amount ranging from 20 to 100 phr. Representative examples of carbon blacks which may be used include those known by their ASTM designations N110, N121, N242, N293, N299, S315, N326, N330, M332, N339, N343, N347, N351, N358, N375, N550, N582, N630, N624, N650, N660, N683, N754, N762, N907, N908, N990 and N991.

A conventional acid acceptor may be present in the mixture of ethylene alpha olefin elastomer and polybutadiene adduct of maleic anhydride. Acid acceptors are known to improve the heat resistance of the rubber. Representative acid acceptors include pentaerythritol, magnesium oxide, litharge (PbO), red lead (Pb3O4), dythal (dibasic lead phthalate), trimal (tribasic lead maleate), epoxy resins, epoxidized oils, calcium hydroxide (Ca(OH)2)), calcium aluminate hexahydrate, magnesium hydratalate, a magnesium oxide-aluminum oxide solid solution and mixtures thereof. The magnesium oxide-aluminum oxide solid solution is generally represented by Mg0.7Al0.3O1.15. Representative of suitable magnesium oxide-aluminum oxide solid solutions are KW-2000 and KW-2100, both commercially available from Kyowa Kagaku Kogyo Co, Ltd, and the like. If used, the amount of the acid acceptor that is utilized ranges from about 1 to about 50 phr, preferably about 2 to about 20 phr.

It is readily understood by those having skill in the art that the rubber composition would be compounded by methods generally known in the rubber compounding art, such as mixing the various constituent rubbers with various commonly used additive materials such as, for example, curing aids and processing additives, such as oils, resins including tackifying resins and plasticizers, fillers, pigments, fatty acid, waxes, antioxidants and antiozonants. The additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, polyethylene glycol, naphthenic and/or paraffinic processing oils. Typical amounts of antioxidants comprise about 1 to about 5 phr. A representative antioxidant is trimethyl-dihydroquinoline. Typical amounts of fatty acids, if used, which can include stearic acid comprise about 0.5 to about 3 phr. Typical amounts of waxes comprise about 1 to about 5 phr. Often microcrystalline and carnauba waxes are used. Typical amounts of plasticizer, if used, comprise from 1 to 100 phr. Representative examples of such plasticizers include dioctyl sebacate, chlorinated paraffins, and the like.

Various non-carbon black fillers and/or reinforcing agents may be added to increase the strength and integrity of the rubber composition for making the power transmission belt of the present invention. An example of a reinforcing agent is silica. Silica may be used in the present composition in amounts from about 0 to 80 parts, and preferably about 10 to 20 parts, by weight based on 100 parts of rubber.

Figure 2:
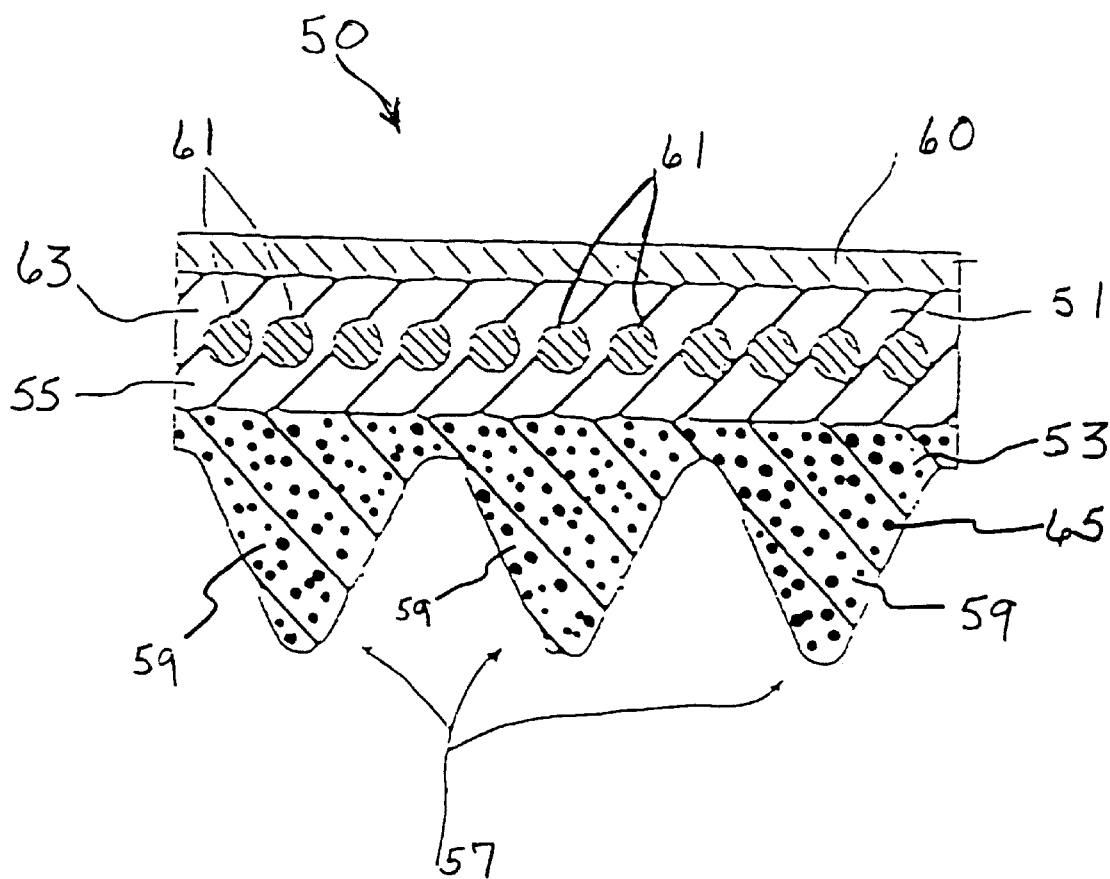
FIG. 2 is a fragmentary perspective view illustrating one embodiment of an endless power transmission belt of this invention.

The elastomer composition may also have fibers or flock distributed throughout. This is particularly the case, as shown in FIG. 2, when the elastomer is used in the cushion section of the belt. The fibers or flock to be distributed throughout the elastomer mix may be any suitable material and is preferably non-metallic fibers such as cotton or fibers made of a suitable synthetic material include kevlar, nylon, polyester, PTFE, fiberglass, and the like. Each fiber may have a diameter ranging between 0.001 inch to 0.050 inch (0.025 mm to 1.3 mm) and length ranging between 0.001 inch to 0.5 inch (0.025 mm to 12.5 mm). The fibers may be used in an amount ranging from 5 to 50 phr.

In addition to the above, solid inorganic lubricants may be present in the mixture of ethylene alpha olefin elastomer and polybutadiene adduct. Representative examples of such lubricants include molybdenum disulfide, PTFE, molybdenum diselenide, graphite, antimony trioxide, tungsten disulfide, talc, mica, tungsten diselenide and mixtures thereof The amount of such solid inorganic lubricants, if used, will generally range from 1 to 25 phr.

A free radical crosslinking reaction is used to cure the rubber containing composition in the belt. Well-known classes of peroxides that may be used include diacyl peroxides, peroxyesters, dialkyl peroxides and peroxyketals. Specific examples include dicumyl peroxide, n-butyl-4,4-di (t-butylperoxy) valerate, 1,1-di(t-butylperoxy)-3,3,5-trimethylcyclohexane, 1,1-di(t-butylperoxy) cyclohexane, 1,1-di(t-amylperoxy) cyclohexane, ethyl-3,3-di(t-butylperoxy) butyrate, ethyl-3,3-di(t-amylperoxy) butyrate, 2,5-dimethyl-2,5-di(t-butylperoxy) hexane, t-butyl cumyl peroxide, a,á-bis(t-butylperoxy)diisopropylbenzene, di-t-butyl peroxide, 2,5-dimethyl-2,5-di(t-butylperoxy) hexyne-3, t-butyl perbenzoate, 4-methyl-4-t-butylperoxy-2-pentanone and mixtures thereof. The preferred peroxide is a,á-bis(t-butylperoxy) diisopropylbenzene. Typical amounts of peroxide ranges from 1 to 12 phr (based on active parts of peroxide). Preferably, the amount of peroxide ranges from 2 to 6 phr.

Crosslinking coagents may be added to the composition. Representative examples of such coagents include triallyl cyanurate, triallyl isocyanurate, triallyl phosphate, triallyl trimellitate, diallylidene pentaerithryte, diallyl terephthalate, tetraallyl oxyethane, triallyl citrate, acetyl triallyl oxyethane, acetyl triallyl citrate, di-, tri-, tetra- and penta-functional acrylates, di-, tri-, tetra- and penta-functional methacrylates, n,n'-m-phenylene-dimaleimide, 1,2-cis-polybutadiene and mixtures thereof Typical amounts of such coagents range from 1 to 30 phr. Preferred ranges of coagents include of from 2 to 10 phr.

The mixing of the rubber composition can be accomplished by methods known to those having skill in the rubber mixing art. For example, the ingredients may be mixed in one stage but are typically mixed in at least two stages, namely at least one non-productive stage followed by a productive mix stage. The final curatives including vulcanizing agents are typically mixed in the final stage which is conventionally called the "productive" mix stage in which the mixing typically occurs at a temperature, or ultimate temperature, lower than the mix temperature(s) than the preceding non-productive mix stage(s).

Curing of the rubber composition for use in the belt is generally carried out at conventional temperatures ranging from about 160° C. to 190° C. Preferably, the curing is conducted at temperatures ranging from about 170° C. to 180° C.

The surface of the fabric 27, if used, on the drive surface may be covered with a short fiber flock 35 by means of an adhesive to directly adhere the flock 35 to the fabric 27. The short fiber flock 35 for use in this invention is characterized by a length range of from 0.12 mm to 9.6 mm and a denier (grams per 9000 meters) of 0.5 to 50. Preferably, the length (measured in the longest direction) ranges from 0.25 to 6 mm and the denier ranges from 0.8 to 25. The most preferred flock has a length of from 0.5 mm to 3 mm and a denier of from 1 to 3. The short fiber flock 35 is uniformly distributed directly on the surface of the drive surface 28 of the power transmission belt 20. In the embodiment shown in FIG. 1, the flock is not dispersed in the elastomer of the compression section 23 but rather the flock is separated from the elastomer in the compression section 23 by the fabric 27. The short fiber flock 35 may be derived from cotton, carbon fiber, rayon, acrylic, Teflon™ (polytetrafluoroethylene), nylon, polyester, aromatic polyamide (aramid), fiberglass and mixtures thereof. The flock 35 may be produced by means known to those skilled in the art, such as by reducing the length of a mass of already short fibers by cutting or grinding. The ground fibers are then graded by screening to eliminate overly long fibers.

There are many types of water- and solvent-based adhesives which may be used to adhere the flock to the surface of the fabric. The particular adhesive that may be used may vary. One conventional adhesive which may be used is known in the art as a RFL (resorcinol-formaldehyde-latex) adhesive. The RFL adhesives comprise a polymer latex which may be based on natural rubber, styrene-butadiene rubber, acrylonitrile-butadiene rubber (NBR), hydrogenated acrylonitrile-butadiene rubber (HNBR) and vinyl pyridine. An optional ingredient to the RFL is an isocyanate compound. Additional examples of conventional adhesives are the resin emulsions sold by BF Goodrich which include polyvinyl acetate, polyacrylic, polyvinyl chloride and polyurethane. Cement solutions (organic) of polymers may also be used as an adhesive. Representative polymers include natural rubber, polychloroprene, acrylonitrile-butadiene copolymers, polyisoprene, zinc salts of unsaturated carboxylic acid ester grafted hydrogenated nitrile butadiene elastomers, styrene-butadiene rubbers, polybutadiene, EPDM, hydrogenated acrylonitrile-butadiene copolymers, polyurethane and ethylene-acrylic elastomers.

The adhesive is first applied to the fabric facing layer 27 and the flock 35 is thereafter applied. The adhesive may be applied to the fabric either before or after being adhered to the compression section 23 of the belt. Preferably, the adhesive and flock are first applied to the fabric facing layer 27 and thereafter the flock-treated fabric 27 is applied to the belt 20.

There are many methods available for applying flock adhesives. In roll-to-roll flocking, the adhesive may be applied with a knife, reverse roll or roll-over-platform coaters. Engraved rolls, spray applicators and rotary screen printers may also be used. Other flock adhesive application methods include silk-screen, dipping, brushing and spraying.

The thickness of the adhesive layer may vary. Generally speaking, the thickness of the adhesive may range from about 0.05 mm to 1 mm. Preferably, the thickness of the adhesive will range from 0.05 to 0.4 mm.

The short fiber flock 35 may be applied to the adhesive-treated fabric in a number of means and thereafter the flocked fabric applied to as uncured belt. The flock may be applied to the adhesive-coated surface either mechanically, electrostatically or by means of a combination of both techniques. Mechanical flocking can be further divided into windblown and beater-bar methods. Electrostatic flocking sometimes incorporates a pneumatic process to propel fibers toward a surface in a windstream. The beater bar method involves passage of the adhesive-treated fabric over a series of polygonal rollers that rapidly rotate to vibrate the substrate. The vibration is used to drive the fiber onto the adhesive. Fibers may be fed to the substrate by gravity from a flock module. Windblown mechanical flocking uses an airstream to deliver the flock to the adhesive-treated fabric. Electrostatic flocking is a known technique which utilizes a field of static electricity to orient fibers and promote their perpendicular alignment. This technique is recommended with longer fibers. In the electrostatic technique, the adhesive-coated substrate passes between the potentials of a high voltage electrostatic field. An electrode is utilized to give the flock a charge. The charged fibers become aligned with the electric field lines of force. The ground potential is formed by the substrate and/or the grounded parts of the machine. The flock is thus attracted to the adhesive where it becomes embedded. Via this method, most of the fibers adhering to the adhesive-coated surface are perpendicular to it. The windblown and electrostatic methods may be utilized simultaneously through pneumatic/electrostatic flocking. With this method, an airstream containing the fibers are directed through a nozzle. At the exit of the nozzle, a charge orients the fibers according to field lines.

The short fiber flock may be applied to the fabric of the belt in a variety of levels. For example, the amount of flock may range from 0.05 kg/m2 to 1.0 kg/m2. The preferred level ranges from about 0.1 kg/m2 to 0.5 kg/m2.

After the fiber flock has been applied, the flocked fabric may be cleaned by suction and the like. Thereafter, the adhesive is dried.

Referring to FIG. 2, there is shown an endless power transmission belt 50 according to another embodiment. Similar to the belt 20 of FIG. 1, the belt 50 comprises a tension section 51, a cushion section 53 and a load-carrying section 55 disposed between the tension section 51 and cushion section 53. Unlike the belt 20 of FIG. 1, the belt 50 of FIG. 2 does not have a fabric layer on the drive surface. The belt 50 of FIG. 1 does have a plurality of ribs 59 or Vs and a fabric-backing 60. The load-carrying section 55 has load-carrying mans in the form of load-carrying cords 61 or filaments which are embedded in an elastomeric matrix 63. The elastomeric compound located in the cushion section 53 is illustrated as being fiber loaded 65.

As known to those skilled in the art, power transmission belts may be built on a drum device. First, the backing is applied to drum as a sheet. Next, any tension section is applied as a sheet followed by spiralling onto the drum the cord or tensile members (load-carrying section). Thereafter, the cushion section is applied followed by the fabric. The assembled laminate or slab is then removed from the drum, placed in a mold, cured and cut into the belts in a manner known to those skilled in the art.

While present exemplary embodiments of this invention and methods of practicing the same have been illustrated and described, it will be recognized that this invention may be otherwise variously embodied and practiced within the scope of the following claims.

What is claimed is:

1. An endless power transmission belt having
   (1) a tension section;
   (2) a cushion section; and
   (3) a load-carrying section disposed between said tension section and cushion section; and the belt containing an elastomeric composition consisting essentially of
      (a) 100 parts of a rubber derived from
         (i) 50 to 100 parts by weight of an ethylene alpha olefin elastomer; and
         (ii) 0 to 50 parts by weight of a rubber selected from the group consisting of silicone rubber, polychloroprene, epichlorohydrin, acrylonitrile rubber, hydrogenated acrylonitrile rubber, zinc salts of unsaturated carboxylic acid ester grafted hydrogenated nitrile butadiene elastomer, natural rubber, styrene-butadiene rubber, 1,4-trans-polybutadiene, ethylene-vinyl-acetate copolymer, ethylene methacrylate copolymers and terpolymers, chlorinated polyethylene, chlorosulfonated polyethylene, alkylated chlorosulfonated polyethylene trans-polyoctenamer, polyacrylic rubber, and mixtures thereof;
      (b) from 1 to 30 parts by weight per 100 parts by weight of total rubber (phr) of a polybutadiene adduct of maleic acid anhydride.

2. The endless power transmission belt of claim 1 wherein said polybutadiene adduct of maleic acid anhydride contains both 1,4 and 1,2 butadiene units.

3. The endless power transmission belt of claim 2 wherein the amount of 1,2 vinyl double bonds ranges from 15 to 90 percent weight percent 1,2 vinyl.

4. The endless power transmission belt of claim 3 wherein the amount of 1,2 vinyl double bonds ranges from 20 to 70 percent weight percent 1,2 vinyl.

5. The endless power transmission belt of claim 1 wherein 100 parts by weight of the rubber used in the elastomeric composition is an ethylene-alpha-olefin elastomer.

6. The endless power transmission belt of claim 1 wherein said ethylene-alpha-olefin elastomer is ethylene-propylene diene terpolymer.

7. The endless power transmission belt of claim 1 wherein said elastomer composition is in the cushion section of the belt.

8. The endless power transmission belt of claim 1 wherein said elastomer composition is in the load-carrying section of the belt.

9. The endless power transmission belt of claim 1 wherein said belt has at least one drive surface having a fabric facing layer bonded to an outer surface of the belt.

10. The power transmission belt of claim 9 wherein said fabric is selected from the group consisting of bidirectional, non-woven, woven and knitted fabric.

11. The power transmission belt of claim 9 wherein the fabric facing layer has flock adhered to said fabric.

12. The power transmission belt of claim 9 wherein the fabric is made of a material selected from the group consisting of nylon, polyester/rayon, cotton, cotton/rayon, polyester, cotton/polyester, nylon/polyester, cotton/nylon, segmented polyurethane, aramid and rayon.

13. The power transmission belt of claim 1 having one driving surface.

14. The power transmission belt of claim 1 having two driving surfaces.

15. The power transmission belt of claim 13 wherein the drive surface of the belt is selected from the group consisting of flat, single V-grooved, multi-V-grooved and synchronous.

16. The power transmission belt of claim 15 wherein the drive surface of the belt is multi-V-grooved.

17. The power transmission belt of claim 7 wherein the cushion section contains fibers distributed throughout the elastomer composition.

18. The power transmission belt of claim 17 wherein said fibers are present in an amount of from 5 to 50 phr.

19. The power transmission belt of claim 1 wherein from 5 to 15 phr of said polybutadiene adduct of maleic acid anhydride is present.

* * * * *